(12) United States Patent
Lo (10) Patent No.: US 8,272,395 B2
(45) Date of Patent: Sep. 25, 2012

(54) WATER DISPENSING DEVICE CAPABLE OF RECYCLING COLD WATER

(75) Inventor: Tsung-Yi Lo, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 732 days.

(21) Appl. No.: 12/477,817

(22) Filed: Jun. 3, 2009

(65) Prior Publication Data

US 2010/0122746 A1 May 20, 2010

(30) Foreign Application Priority Data

Nov. 20, 2008 (TW) .............................. 97144803 A (51) Int. Cl.
*F16K 49/00* (2006.01)
(52) U.S. Cl. ........................................................ 137/337
(58) Field of Classification Search .................. 137/337
See application file for complete search history.

(56) References Cited

U.S. PATENT DOCUMENTS 5,564,462 A * 10/1996 Storch ............................ 137/337
8,066,196 B2 * 11/2011 McMurtry ..................... 137/337

* cited by examiner

*Primary Examiner* — Eric Keasel (57) ABSTRACT

A water dispensing device capable of recycling cold water comprises a mixing valve connected with a first pipe for supplying cold water and a second pipe for supplying hot water; at least one watering member connected with an output end of the mixing valve; a bucket connected with the output end of the mixing valve and the first pipe to store water from the mixing valve; a control unit being used to sense a temperature of the water flow passing through the mixing valve; as a sensed temperature is less than a set value, the cold water stored in a pipe system will be guided to recycle toward the bucket and to be supplied to the first pipe, obtaining recycling and reusing purpose; while the sensed temperature is more than the set value, the cold water stored in the pipe system will be guided to flow toward the watering members.

15 Claims, 10 Drawing Sheets

WATER DISPENSING DEVICE CAPABLE OF RECYCLING COLD WATER

BACKGROUND OF THE INVENTION

1. Field of the Invention

The present invention relates to a water dispensing device capable of recycling cold water that can be applied in shower equipment to recycle and reuse cold water in the pipes.

2. Description of the Prior Art

Many conventional watering devices, especially in shower equipment, are operated by manual labor or electrical pressing method to adjust a mixing valve for mixing the hot and cold waters together at a proper proportion and then the water will be sprayed outward through body jet, handheld showerhead and overhead showerhead, etc.

However, some hot water will leave in flowing pipes of a heater and a mixing valve. After a period of time, the left hot water become cold and be sprayed outward after user turns on the mixing valve once more, but such cold water do not reach an appropriate high temperature, according it will be flowed away but not to be used, causing a source consumption.

The present invention has arisen to mitigate and/or obviate the afore-described disadvantages.

SUMMARY OF THE INVENTION

The primary object of the present invention is to provide a water dispensing device capable of recycling cold water which is capable of overcoming the shortcomings of the conventional water dispensing device.

A water dispensing device capable of recycling cold water in accordance with the present invention comprises:

a mixing valve connected with a first pipe for supplying cold water and a second pipe for supplying hot water and being turned on/off so that the cold water and the hot water mix at a proper proportion to be outputted;

at least one watering member connected with an output end of the mixing valve;

a bucket connected with the output end of the mixing valve and the first pipe to receive lower-pressure cold water when a diverter diverts flow to the bucket as a water temperature is too low, and as the mixing valve is opened and the lower-pressure cold water in the bucket reaches a predetermined condition, the lower-pressure cold water in the bucket is supplied to the first pipe so as to completely or partially replace high-pressure cold water; as the lower-pressure cold water in the bucket does not satisfy the predetermined condition, a supply of the low-pressure cold water is stopped, thereby restarting a supply of the high-pressure cold water;

a control unit to sense a temperature of the water flow which passes through the mixing valve, as a sensed temperature is less than a water flowing set value, cooled water stored in the second pipe is recycled toward the bucket and then is supplied to the first pipe, thereby obtaining recycling and reusing purpose, while the sensed temperature is more than the water flowing set value, the cold water stored in the first pipe flows toward the at least one watering member;

wherein the control unit further comprises:

the diverter disposed on first flowing pipes between the output end of the mixing valve and the at least one watering member and on second flowing pipes between the output end of the mixing valve and an input end of the bucket to be controlled;

a temperature sensor serving as sensing a temperature of water flow which passes through the mixing valve, as the temperature is lower than a set value, the diverter communicates the output end of the mixing valve with the bucket, and a flowing pipe between the mixing valve and the at least one watering member is closed so that cold water stored in the pipe is recycled toward the bucket, as the temperature is higher than the set value, the diverter communicates the output end of the mixing valve with the at least one watering member, and the flowing pipe between the mixing valve and the bucket is closed so that cold water stored in the pipe is guided to the at least one watering member.

The water dispensing device capable of recycling cold water further comprises:

a pressure on-off valve connected with the first pipe and an output end of the bucket and allowing to be in an open state as the mixing valve is actuated, and as the water in the bucket is over a predetermined pressure, the output end of the bucket communicates with the first pipe, and the first pipe between the high-pressure cold water and the mixing valve is closed so that the low-pressure cold water from the bucket is guided to the first pipe; and as the pressure of the bucket is lower than the predetermined pressure, the output end of the bucket and the first pipe are closed, and the first pipe between the high-pressure cold water and the mixing valve is communicated to restart the supply of high-pressure cold water.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
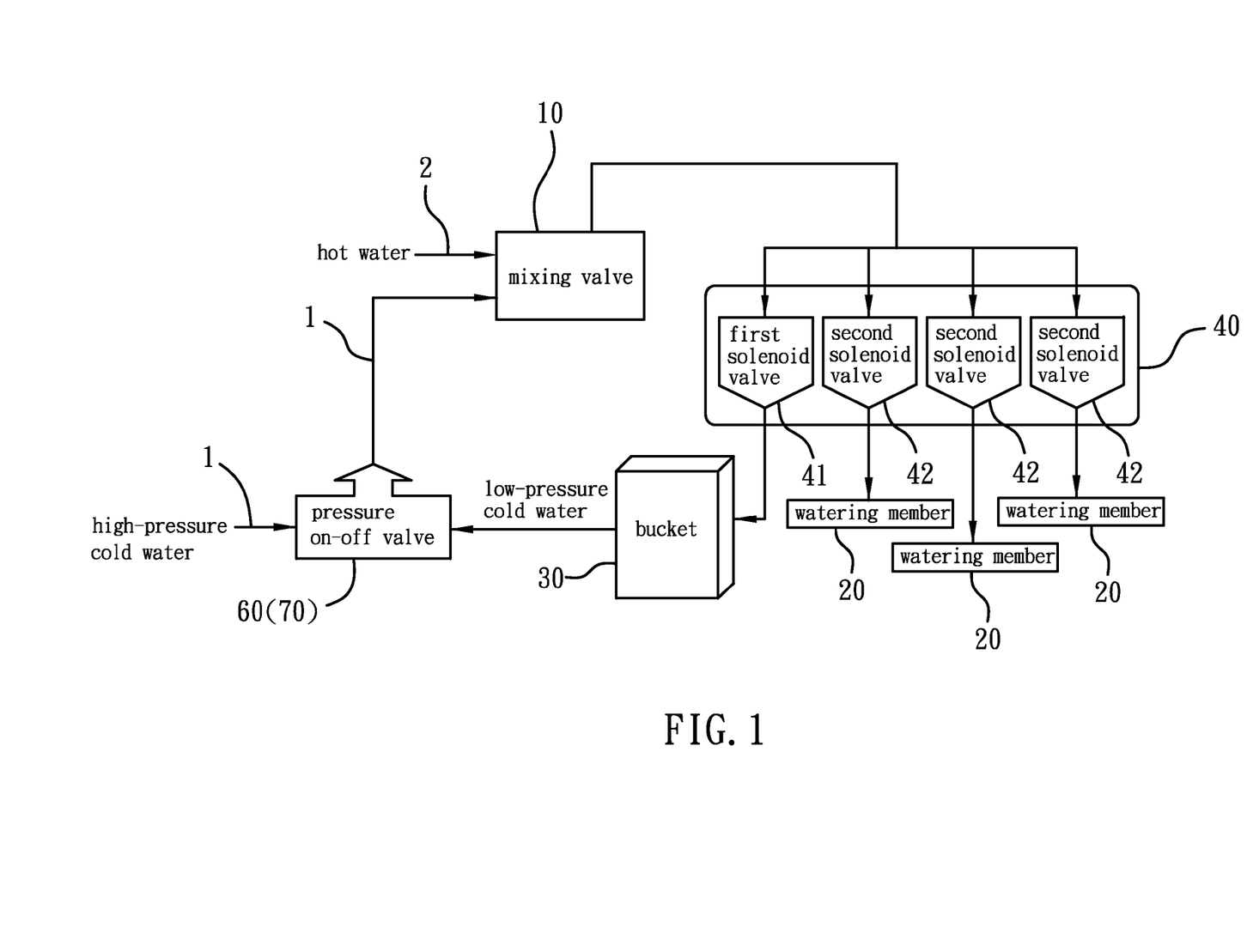
FIG. 1 is a block diagram showing water flow of a water dispensing device capable of recycling cold water in accordance with a first embodiment of the present invention.
Figure 1A:
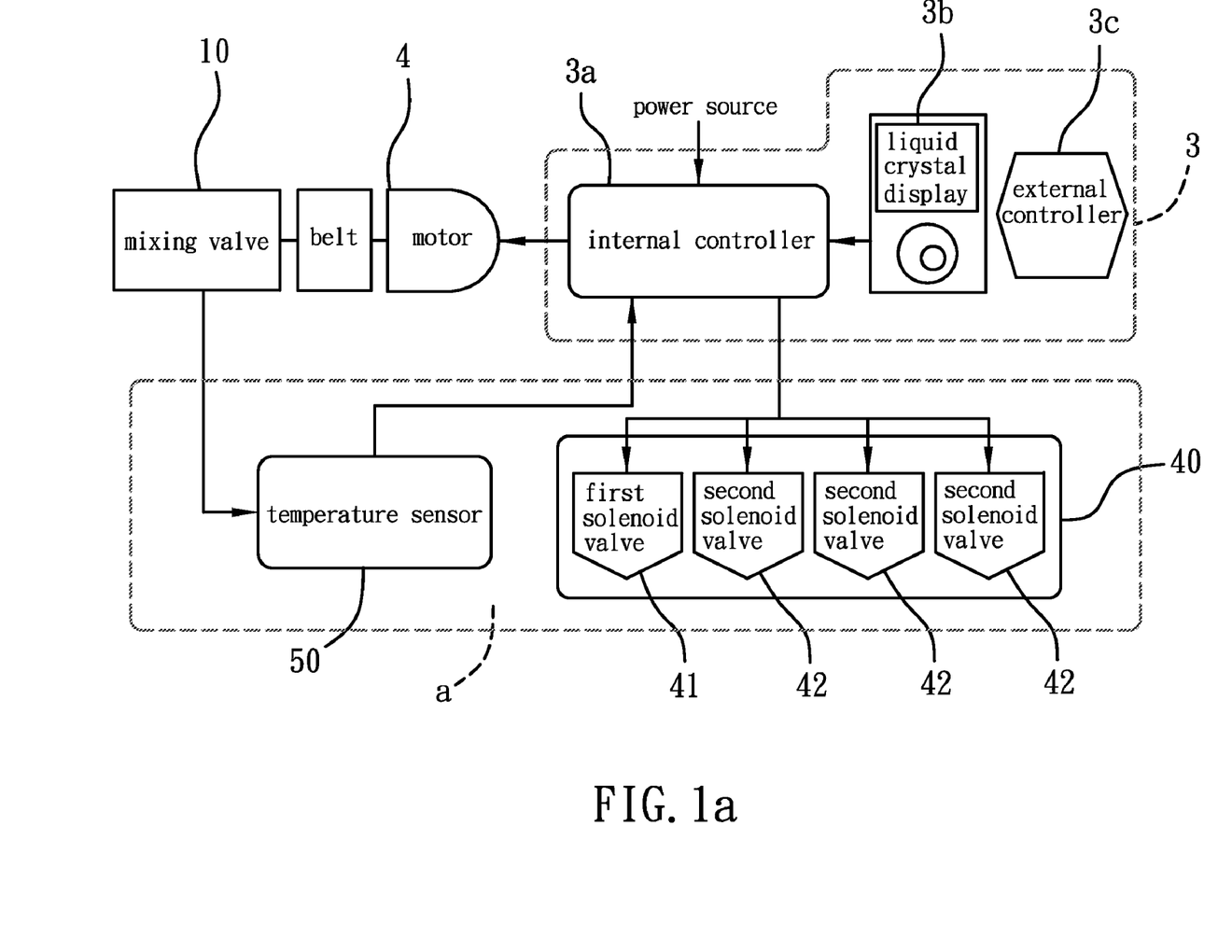
FIG. 1a is a block diagram showing circuit of the water dispensing device capable of recycling cold water in accordance with the first embodiment of the present invention.

Referring to FIGS. 1 and 1a, a water dispensing device capable of recycling cold water according to a first embodiment of the present invention comprises a cold and hot water mixing valve 10, a plurality of watering members 20, a bucket 30, a control unit a, and a pressure on-off valve 60.

The mixing valve 10 is connected with a first pipe 1 for supplying cold water and a second pipe 2 for supplying hot water and is turned on/off so that the cold water and the hot water mix at a proper proportion to be outputted.

Each of the watering members 20 is connected with an output end of the mixing valve 10 so that the water in watering member 20 is expelled selectively via the mixing valve 10. The watering member 20 is selected from body jet, handheld showerhead, and overhead showerhead.

The bucket 30 is coupled with the output end of the mixing valve 10 and the first pipe 1.

The control unit a is used to sense a temperature of the water flow which passes through the mixing valve 10, as a sensed temperature is less than a water flowing set value, cooled water stored in the second pipe is recycled toward the bucket 30 and then is supplied to the first pipe, thereby obtaining recycling and reusing purpose, while the sensed temperature is more than the water flowing set value, the cold water stored in the first pipe flows toward the at least one watering member 20; wherein the diverter 40 is disposed on first flowing pipes between the output end of the mixing valve 10 and the at least one watering member 20 and on second flowing pipes between the output end of the mixing valve 10 and an input end of the bucket 30 to be controlled appropriately. The mixing valve 10 is coupled with one of the at least one watering member 20 or the bucket 30 alternatively; the diverter 40 further includes a first solenoid valve 41 and three second solenoid valves 42;

the first solenoid valves 41 is fixed on a water pipe between the mixing valve 10 and the bucket 30 and is closed in a normal status, as the first solenoid valves 41 is opened, the output end of the mixing valve 10 communicates with the bucket 30;

the second solenoid valves 42 are mounted on another water pipe between the mixing valve 10 and the watering members 20 respectively and is closed in a normal status; wherein any of the second solenoid valves 42 can be opened by user so that the output end of the mixing valve 10 and the watering members 20 in response to the second solenoid valves 42 are communicated with each other.

A temperature sensor 50 serves as sensing the temperature of water flow which passes through the mixing valve 10. As the temperature is lower than a set value for watering requirement, the first solenoid valve 41 of the diverter 40 is opened, yet as the temperature is higher than the set value, the second solenoid valves 42 of the diverter 40 are opened.

Figure 2:
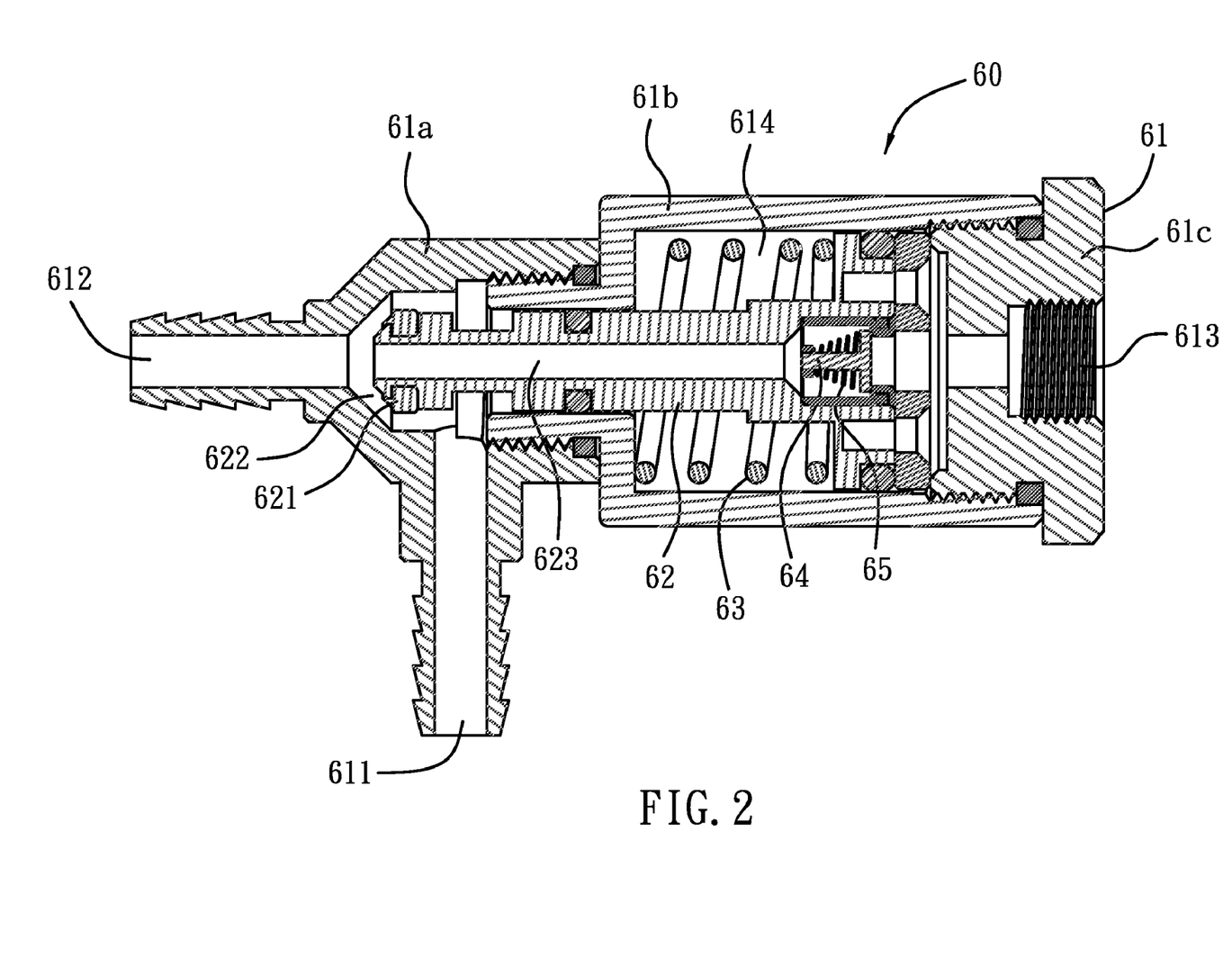
FIG. 2 is a cross sectional view of a sole pressure on-off valve of the water dispensing device capable of recycling cold water in accordance with the first embodiment of the present invention.

The pressure on-off valve 60 as shown in FIG. 2 further includes:

a valve base 61 being provided with an inlet 611 for inflowing high-pressure cold water, an outlet 612, a low-pressure cold water intake 613 for inflowing low-pressure cold water, and an inner chamber 614; the valve base 61 including a first valve member 61a and a second valve member 61b, both of which are screwed with each other, and a third valve member 61c; the first valve member 61a including one part of the inlet 611, the outlet 612, and the inner chamber 614; the second valve member 61b is formed a main part of the inner chamber 614; the third valve chamber 61c is formed the low-pressure cold water intake 613.

Figure 3:
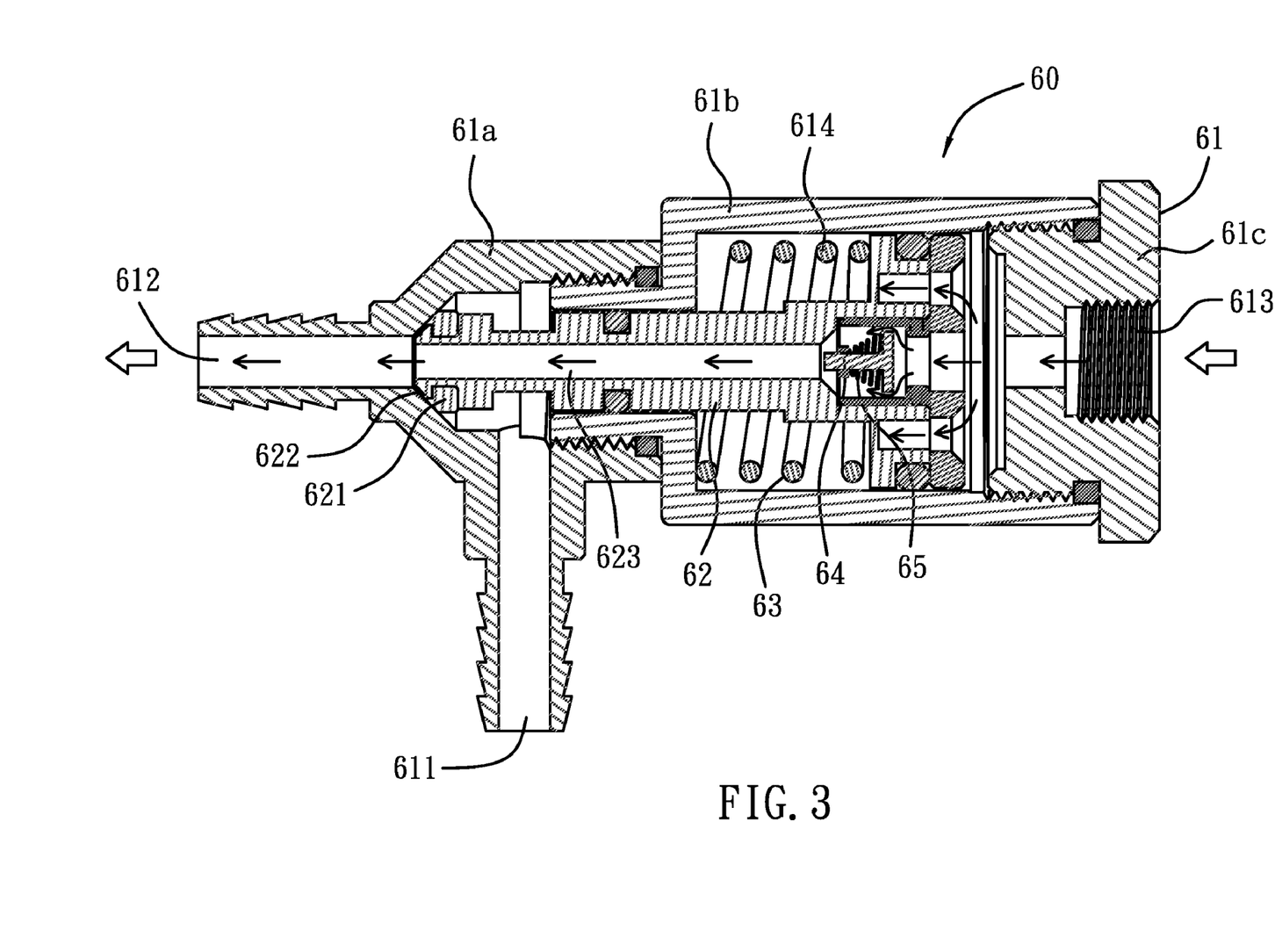
FIG. 3 is a cross sectional view of the sole pressure on-off valve of the water dispensing device of the first embodiment of the present invention being in a low-pressure cold water supplying state.

A first valve core 62 is defined in the inner chamber 614 of the valve base 61 and resiliently biased rearward so that a seal washer 621 which is fixed on a front end keeps away from a high-pressure cold water passage 622 between the inlet 611 and the outlet 612, such that the high-pressure cold water passage 622 keeps in a communicating state. As the pressure of low-pressure cold water is more than a predetermined pressure, the first valve core 62 is pushed forward so that the high-pressure cold water passage 622 is closed by the seal washer 621 as illustrated in FIG. 3. The first valve core 62 includes a low-pressure cold water passage 623 formed therein and coupled with the low-pressure cold water intake 613 and the outlet 612.

A first resilient element 63 is a compression spring so that the first valve core 62 is resiliently biased rearward, such that the seal washer 621 keeps away from the high-pressure cold water passage 622, and the high-pressure cold water passage 622 keeps in a communicating state, thereby the first valve core 62 still owns elasticity to returns its initial positions.

A second valve core 64 is defined on a rear end portion of the low-pressure cold water passage 623 and is elastically abutted rearward to close the low-pressure cold water passage 623 between the low-pressure cold water intake 613 and the outlet 612. While the pressure of the low-pressure cold water is over a predetermined pressure, the second valve core 64 is pushed forward to open so that the low-pressure cold water passage 623 is opened as shown in FIG. 3.

A second resilient element 65, which is a compression spring in this embodiment of the present invention, is used to push the second valve core 64 rearward so as to close the low-pressure cold water passage 623 normally, such that the second valve core 64 owns elasticity to return its original position.

The water dispensing device of the first embodiment of the present invention is applied in a digital shower system, therefore the mixing valve 10 is used a digital control valve such that a digital controller module 3 drives the mixing valve 10 by using a motor 4, wherein the digital controller module 3 includes an internal controller 3a with a central processor (not shown) and a liquid crystal display 3b. Of course, an external controller 3c is used to control the liquid crystal display 3b. A user can apply the internal controller 3a or the external controller 3c to set various operations and display a variety of numeral values and states and the like massages, the internal controller 3a is used to receive and process detected signals from the temperature sensor 50 so as to turn on/off and control the first and second solenoid valves 41, 42 of the diverter 40. Because the digital operation mode is well known, further remarks will be omitted.

Referring to FIG. 1, as the user turns on one of the watering members 20 by using the internal controller 3a or the external controller 3c of the digital controller module 3, the motor 4 is actuated to drive the mixing valve 10 in a open state so that the cold water from the first pipe 1 and/or the hot water from the second pipe 2 is outputted via the mixing valve 10 independently or the hot water from the second pipe 2 is mixed at a proper proportion to be outputted via the mixing valve 10. The temperature sensor 50 senses the temperature of the water flow which passes through the mixing valve 10, wherein as the temperature is lower than a set value for water outflow requirement, it implies that the hot water supplied from the second pipe 2 does not reach the mixing valve 10 and the water flow passing through the mixing valve 10 is the cold water flow stored in the pipes. To prevent such water from being expelled before reaching the required temperature, the first solenoid valve 41 of the diverter 40 is turned on to guide the water into the bucket 30 to be stored and then to be outputted as required. When the sensed temperature is over a set value of water flowing requirement, the first solenoid valve 41 is closed and the second solenoid valves 42 in response to the selected watering member 20 are turned on so that the water flow which passes through the mixing valve 10 is guided to the watering member 20 to be expelled, thus having a shower.

Figure 4:
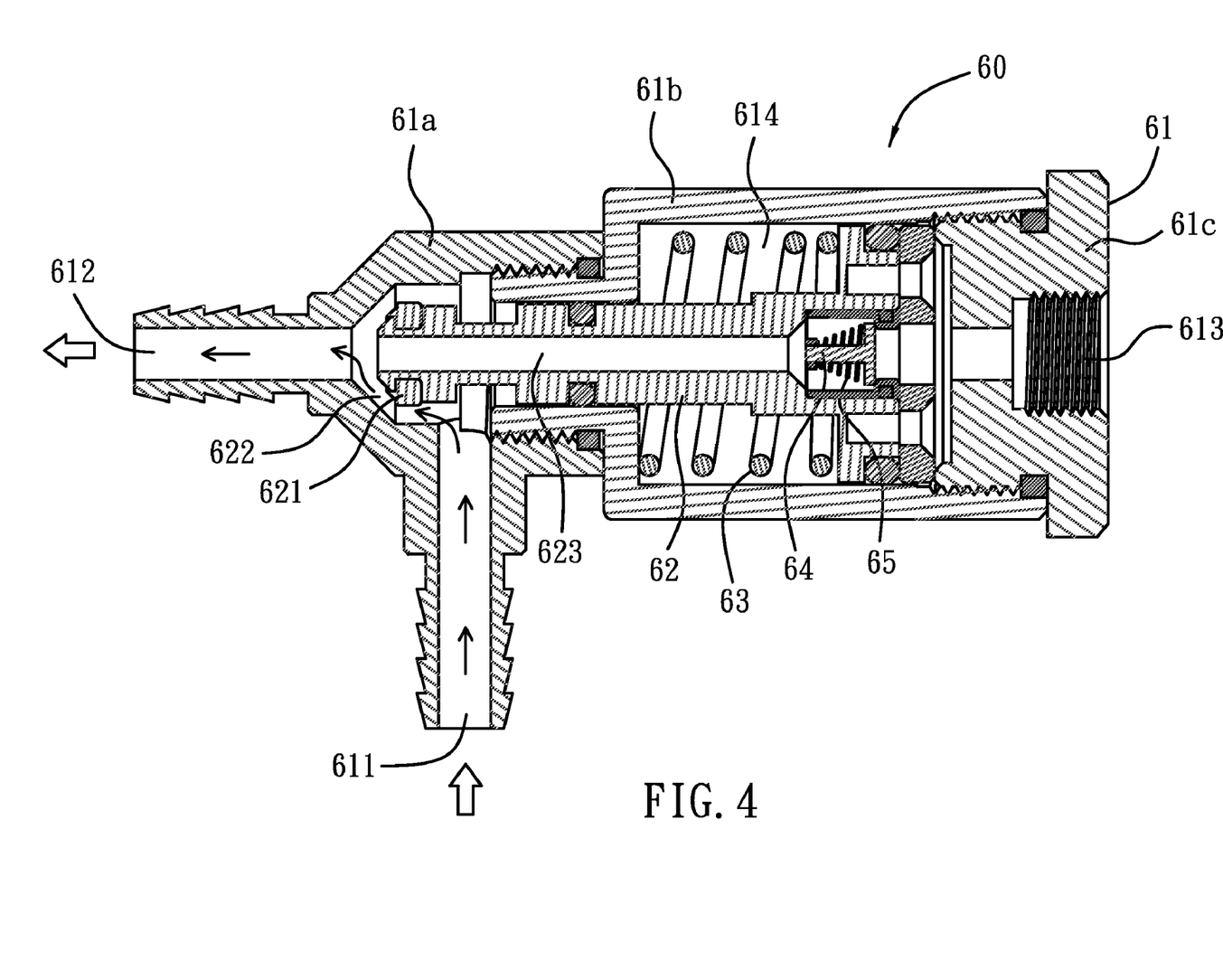
FIG. 4 is a cross sectional view of the sole pressure on-off valve of the water dispensing device of the first embodiment of the present invention being in a high-pressure cold water supplying state.

As above description, the water stored in the bucket 30 is guided into the first pipe 1 in water supplying operation, therefore as the user turns on the water dispensing device once more, the temperature sensor 50 senses the temperature of water flow of the mixing valve 10 and the cold water recycling and supplying is under process. As the user turns on the mixing value 10 to outflow water, the pressure in the bucket 30 reaches a predetermined value so that the pressure resists against the elasticity of the first and second resilient elements 63, 65 by communicating water flow pressure via the low-pressure cold water intake 613 of the pressure on-off valve 60, thereby actuating the first and second valve cores 62, 64. Thereafter, the high-pressure cold water passage 622 is closed and the lower-pressure cold water passage 623 is opened as shown in FIG. 3, such that the lower-pressure cold water in the bucket 30 is guided into the first pipe 1 through the low-pressure cold water intake 613, the low-pressure cold water passage 623, and the outlet 612 and supplies the mixing valve 10 with cold water, thus recycling cold water. It is to be noted that as the water in the bucket 30 decreases, the water pressure in the bucket 30 is also lowered. Therefore, as the water pressure is lower than the elasticity of the first and the second valve cores 62, 64, the first and the second valve cores 62, 64 automatically return to their initial positions so that the high-pressure cold water passage 622 recovers an open state and the low-pressure cold water passage 623 is closed as illustrated in FIG. 4, so as to stop a supply of the low-pressure cold water and to restart the supply of the low-pressure cold water.

Figure 5:
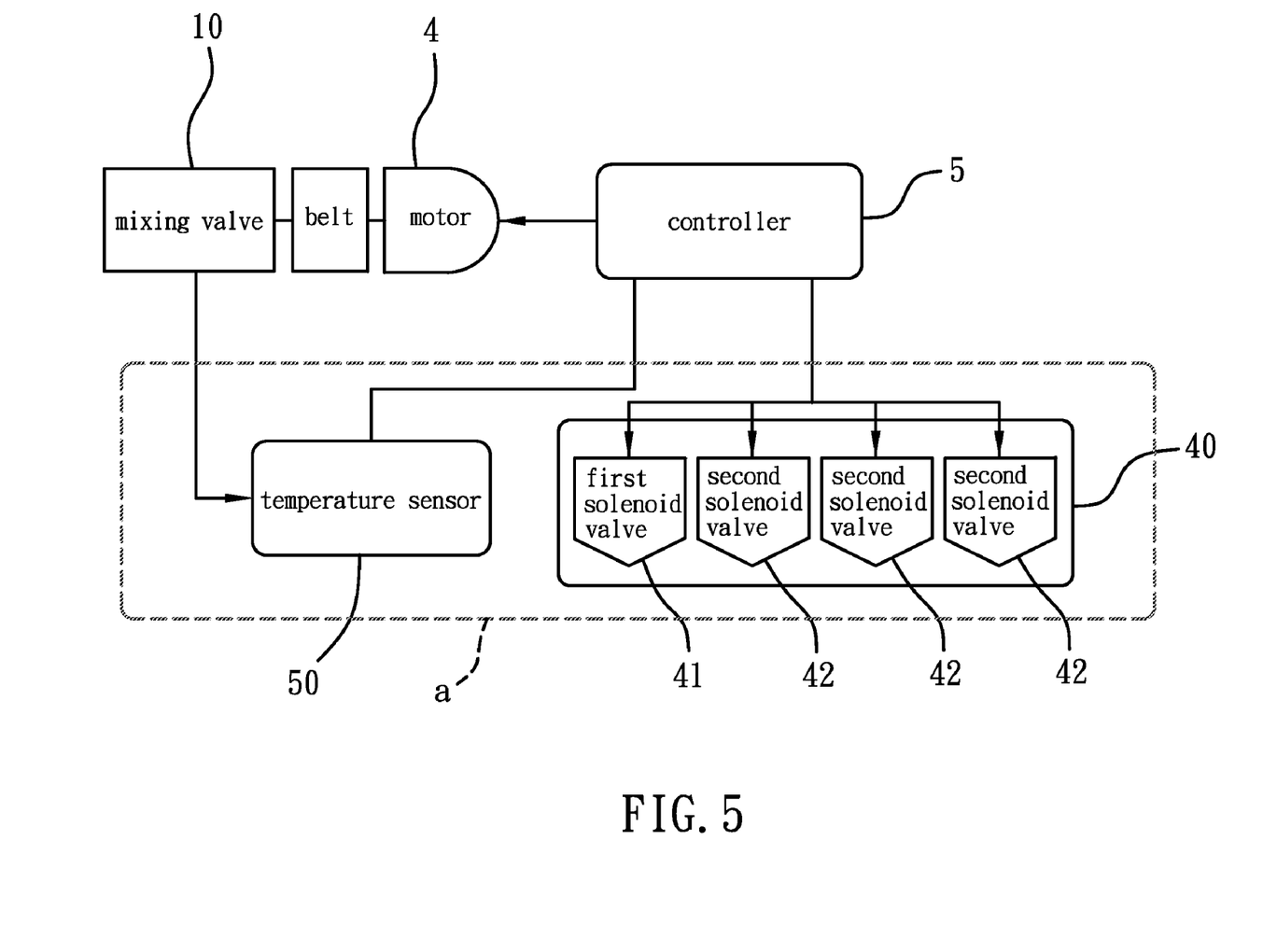
FIG. 5 is a block diagram showing related components of a water dispensing device capable of recycling cold water in accordance with a second embodiment of the present invention.

As illustrated in FIG. 5, the difference of a second embodiment of the present invention from the first embodiment of the present invention is that a controller 5 is used to replace the digital controller module 3 and to match with the second solenoid valves 42 and one of the watering members 20 so that the user operates the mixing valve 10 by ways of the controller 5 and the motor 4.

The water dispensing devices of the first and second embodiments of the present invention are designed to a digital control valve but also can be a manually mechanical type. However, the mixing valve 10 of the water dispensing device of the first embodiment is driven by the motor 4 and the detected signal of the temperature sensor 50 is transmitted to the digital controller module 3 or the controller 5 so as to control the diverter 40. However, the mixing valve 10 of the water dispensing device of the second embodiment is a mechanical control valve operated manually, and the temperature sensor 50 is used to directly control the diverter 40, hence the mixing valve 10 of the present invention is used in a digital or mechanical control valve type.

To comply with safety regulations, the bucket 30 cooperates with a release valve (not shown) to approach some predetermined conditions, thus releasing water in the bucket properly, wherein the release valve is installed on the bucket 30 independently or coupled on the pipes between the bucket 30 and the first solenoid valve 41. The predetermined condition is a predetermined level or pressure.

Except for the sole bucket 30, a plurality of tubular containers (not shown), which are joined together by using their upper and lower ends, are arranged in an appropriate manner to assemble another bucket, and the upper and lower ends of the tubular containers are in communication with each other by using at least one offset tube, such that the pressure value of each of the tubular containers is smaller than that of the sole bucket, thereby enhancing the safe coefficient of the bucket to bear pressure. Furthermore, as receiving space is limited, the bucket formed of the tubular containers can also be arranged in the limited space by changing the number of the tubular containers.

Figure 6:
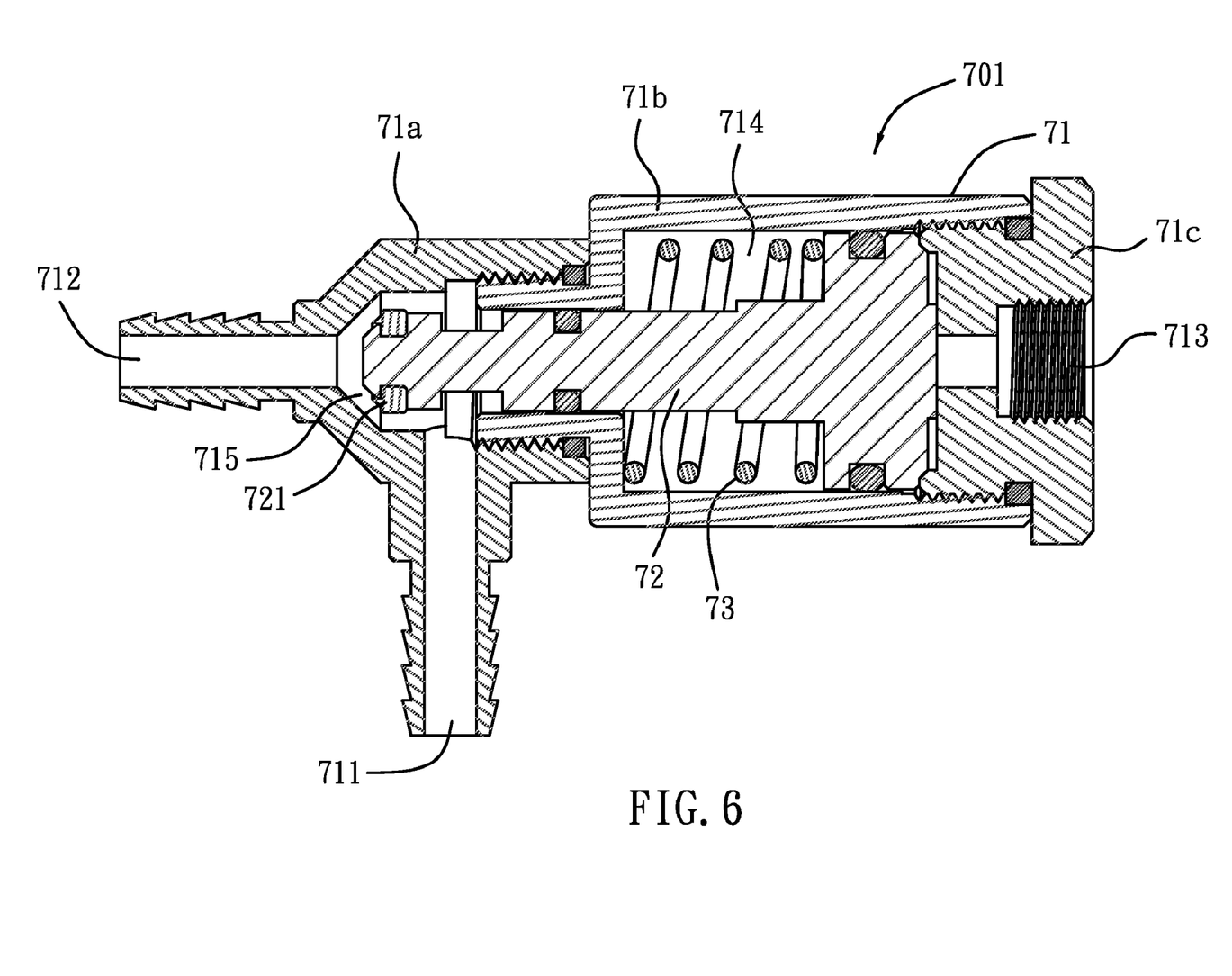
FIG. 6 is a cross sectional view of a pressure valve of a multi-valve type of pressure on-off valve.
Figure 7:
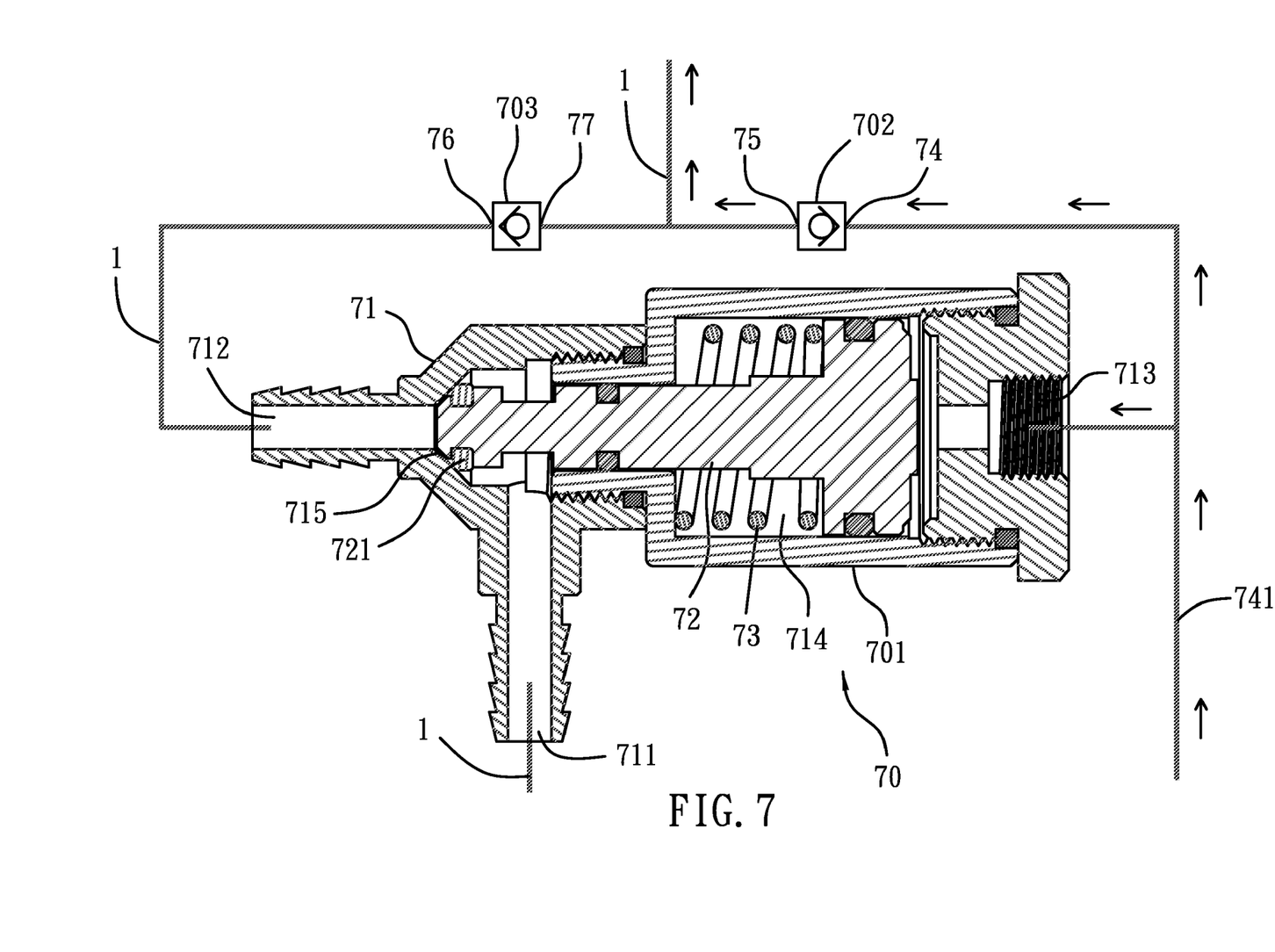
FIG. 7 is a cross sectional view showing the pressure valve of the multi-valve type of pressure on-off valve being in a low-pressure cold water supplying state.

The pressure on-off valves 60 of the water dispensing device according to the first and second embodiments of the present invention are a sole valve but not be limited in the sole valve type. As shown in FIGS, 6 and 7, a pressure on-off valve 70 is assembled in a multi-valve manner and includes a pressure valve 701, a first check valve 702, and a second check valve 703, wherein the pressure valve 701 further includes a valve base 71, a valve core 72, and a resilient element 73, the valve base 71 includes a high-pressure cold water inlet 711 for inputting the high-pressure cold water, a cold water outlet 712, a low-pressure cold water intake 713 for inputting low-pressure cold water, and an inner chamber 714, all of which are in communication with each other. The valve core 72 is defined in the inner chamber 714 of the valve base 71 and is pushed rearward by the resilient element 73 so that a seal washer 721 on a front end of the valve core 72 keeps away from a high-pressure cold water passage 715 between the high-pressure cold water inlet 711 and a high-pressure cold water passage 715, thereby keeping the high-pressure cold water passage 715 in an open state. As the pressure of the valve core 72 from the lower-pressure cold water of the low-pressure cold water intake 713 is over a predetermined pressure, the valve core 72 resists against the resilient element 73 forward and closes the high-pressure cold water passage 715 as shown in FIG. 7. The resilient element 73 is a compression spring to push the valve core 72 rearward so that the seal washer 721 keeps away from the high-pressure cold water passage 715, thus keeping the high-pressure cold water passage 715 in an open status, such that the valve core 72 returns its original position automatically. The valve base 71 of the second embodiment of the present invention includes a first valve member 71a, a second valve member 71b, and a third valve member 71c, all of which are screwed with each other; the first valve member 71a includes the high-pressure cold water inlet 711, the cold water outlet 712, and one part of the inner chamber 714; the second valve member 71b is a main part of the inner chamber 714; the third valve member 71c is the low-pressure cold water intake 713.

The first check valve 702 includes a low-pressure cold water port 74 and a cold water opening 75, the low-pressure cold water port 74 communicates with the low-pressure cold water passage 741 between the output end of the bucket 30 and the low-pressure cold water intake 713. The cold water opening 75 is in communication with the first pipe 1 between the cold water outlet 712 of the pressure valve 701 and an input end of the mixing valve 10.

The second check valve 703 includes a cold-water inflowing bore 76 and a cold-water out flowing hole 77, the cold-water inflowing bore 76 communicates with the cold water outlet 712 of the pressure valve 701 via the first pipe 1 and the cold water opening 75 of the first check valve 702.

Figure 8:
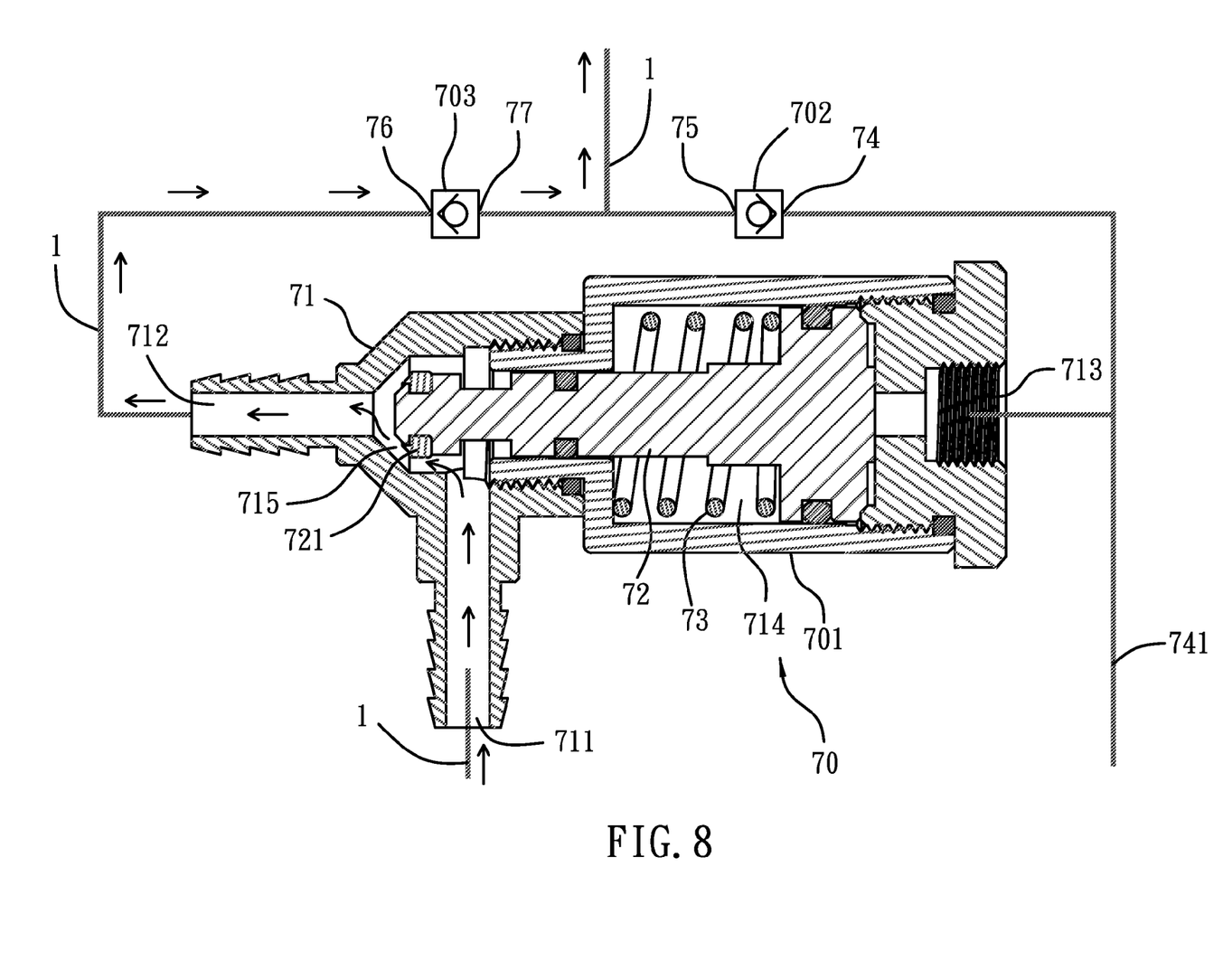
FIG. 8 is a cross sectional view showing the pressure valve of the multi-valve type of pressure on-off valve being in a high-pressure cold water supplying state.

The pressure on-off valve 70 is used to replace the pressure on-off valves 60 of the first and second embodiments of the present invention, the difference of the pressure on-off valve 70 from the pressure on-off valves 60 is that as the pressure of the bucket 30 is over a predetermined pressure, e.g., the water pressures of the low-pressure cold water intake 713 and the low-pressure cold water port 74 are more than the elasticity of inner parts (not shown) of the resilient element 73 and the first check valve 702, the valve core 72 of the pressure valve 701 is pushed forward by the water flow so as to close the high-pressure cold water passage 715 and open the first check valve 702 as illustrated in FIG. 6, such that the low-pressure cold water in the bucket 30 is guided to flow into the first pipe 1 via the low-pressure cold water passage 741 and the first check valve 702, and the low-pressure cold water is stopped by the second check valve 703 to prevent from flowing to the cold water outlet 712 of the pressure valve 701, thereby recycling the cold water. On the contrary, as the pressure in the bucket 30 is lower than the predetermined pressure, the valve core 72 of the pressure valve 701 is pushed backward by the resilient element 73 as shown in FIG. 8 so that the high-pressure cold water passage 715 recovers an open state, such that the high-pressure cold water can be guided into the first pipe 1 from the high-pressure cold water inlet 711 of the pressure valve 701 via the high-pressure cold water passage 715 and the cold water outlet 712, and then the second check valve 703 is opened by the high-pressure cold water to flow into the mixing valve 10 and to stop the high-pressure cold water from flowing to the low-pressure cold water passage 741, thus starting the supply of high-pressure cold water.

Figure 9:
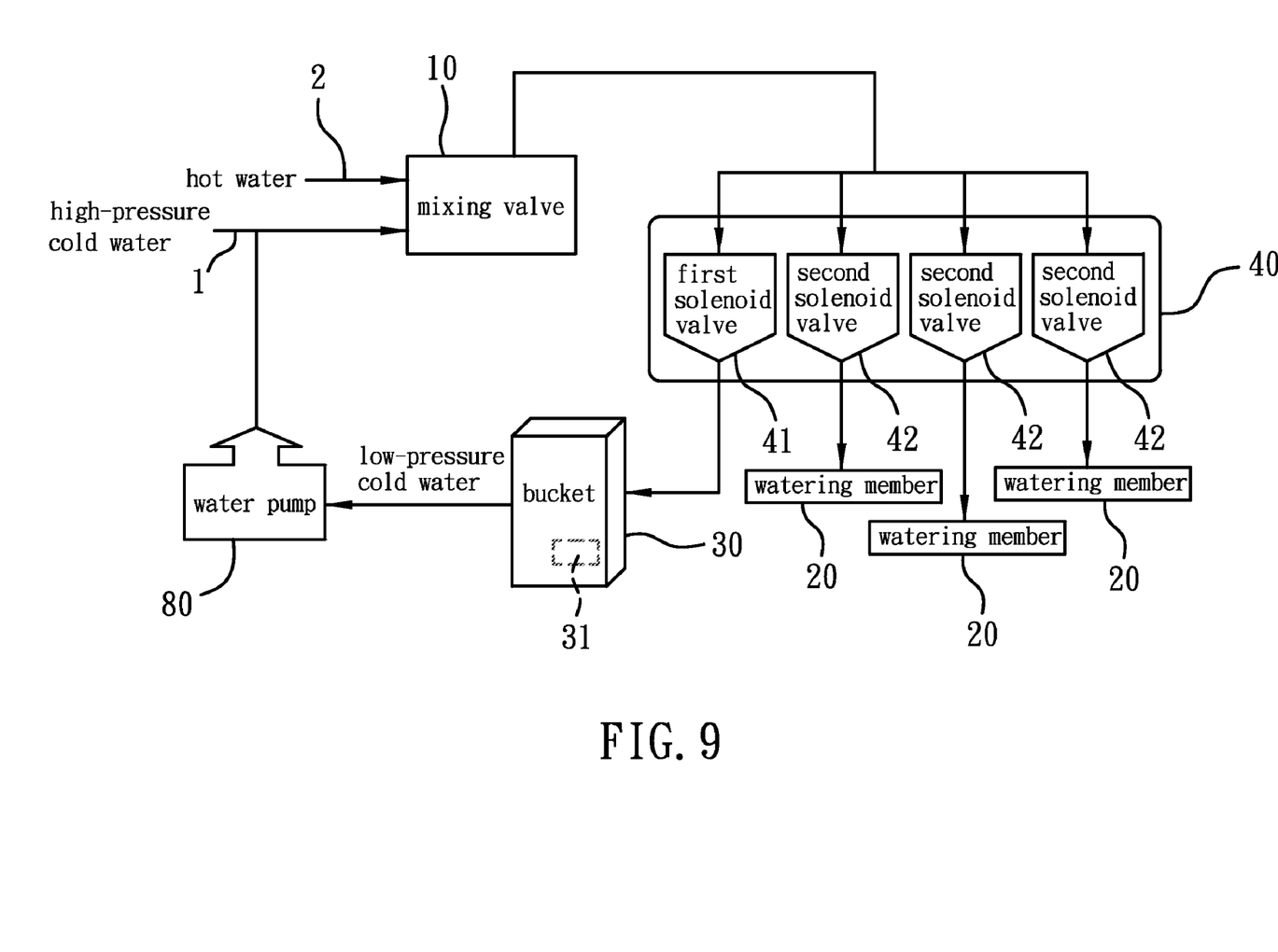
FIG. 9 is a block diagram showing water flow of a water dispensing device capable of recycling cold water in accordance with a third embodiment of the present invention.

As illustrated in FIG. 9, the difference of a third embodiment of the present invention from the first embodiment of the present invention is that a water pump 80 is used to replace the pressure on-off valve 60 and defined between the first pipe 1 and the output end of the bucket 30 so that as the mixing valve 10 is opened and the water in the bucket 30 reaches a predetermined condition, the water pump 80 is actuated to push the low-pressure cold water in the bucket 30 toward the first pipe 1, thus replacing the supply of high-pressure cold water. Also, as the water in the bucket 30 does not satisfy the predetermined condition, the water pump 80 is stopped to suspend the supply of low-pressure cold water and starts the supply of high-pressure cold water, wherein the predetermined condition is a predetermined pressure of storing water or a predetermined level. The water pump 80 is started or stopped operating by detecting the pressure of storing water or the level in the bucket 30. It is to be noted that a level detector 31 for detecting the level in the bucket 30 is disposed in the bucket 30, and the level detector 31 is a ball float type or other type. Moreover, as the water pump 80 pushes the low-pressure cold water in the bucket 30 to the first pipe 1, the supply of high-pressure cold water is stopped so that the low-pressure cold water can replace all or partial high-pressure cold water.

Likewise, the water pump 80 is used to replace the pressure on-off valve 70 of the second embodiment of the present invention.

While we have shown and described various embodiments in accordance with the present invention, it is clear to those skilled in the art that further embodiments may be made without departing from the scope of the present invention.

What is claimed is:

1. A water dispensing device capable of recycling cold water comprising:
   a mixing valve connected with a first pipe for supplying cold water and a second pipe for supplying hot water and being turned on/off so that the cold water and the hot water mix at a proper proportion to be outputted;
   at least one watering member connected with an output end of the mixing valve;
   a bucket connected with the output end of the mixing valve and the first pipe to receive lower-pressure cold water when a diverter diverts flow to the bucket as a water temperature is too low, and as the mixing valve is opened and the lower-pressure cold water in the bucket reaches a predetermined condition, the lower-pressure cold water in the bucket is supplied to the first pipe so as to completely or partially replace high-pressure cold water; as the lower-pressure cold water in the bucket does not satisfy the predetermined condition, a supply of the low-pressure cold water is stopped, thereby restarting a supply of the high-pressure cold water;
   a control unit to sense a temperature of the water flow which passes through the mixing valve, as a sensed temperature is less than a water flowing set value, cooled water stored in the second pipe is recycled toward the bucket and then is supplied to the first pipe, thereby obtaining recycling and reusing purpose, while the sensed temperature is more than the water flowing set value, the cold water stored in the first pipe flows toward the at least one watering member;
   a pressure on-off valve connected with the first pipe and an output end of the bucket and allowing to be in an open state as the mixing valve is actuated, and as the water in the bucket is over a predetermined pressure, the output end of the bucket communicates with the first pipe, and the first pipe between the high-pressure cold water and the mixing valve is closed so that the low-pressure cold water from the bucket is guided to the first pipe; and as the pressure of the bucket is lower than the predetermined pressure, the output end of the bucket and the first pipe are closed, and the first pipe between the high-pressure cold water and the mixing valve is communicated to restart the supply of high-pressure cold water;
   wherein the pressure on-off valve is a sole valve and further comprises:
   a valve base including a high-pressure cold water inlet for inputting the high-pressure cold water, a cold water outlet, a low-pressure cold water intake for inputting the low-pressure cold water from the bucket and an inner chamber, all of which are in communication with each other;
   a first valve core defined in the inner chamber of the valve base and allowing to communicate the high-pressure cold water inlet and the cold water outlet with each other; as a pressure of the low-pressure cold water intake is over a predetermined pressure, the valve first core is pushed forward to close a high-pressure cold water passage; the first valve core including a low-pressure cold water passage to communicate with the low-pressure cold water intake and the cold water outlet;
   a first resilient element to keep the first valve core away from the high-pressure cold water passage so that the high-pressure cold water passage keeps in a communicating state and the first valve core owns elasticity to return its initial positions;
   a second valve core defined on a predetermined portion of the low-pressure cold water passage of the first valve core allowing to close the low-pressure cold water passage; while a pressure of the low-pressure cold water is over a predetermined pressure, the second valve core is pushed forward to open so that the input end of the bucket communicates with the first pipe via the low-pressure cold water intake, the low-pressure cold water intake, and the cold water outlet;
   a second resilient element to push the second valve core rearward so as to close the low-pressure cold water passage, such that the second valve core owns elasticity to return its original position.

2. The water dispensing device capable of recycling cold water as claimed in claim 1, wherein the control unit further comprises:
the diverter disposed on first flowing pipes between the output end of the mixing valve and the at least one watering member and on second flowing pipes between the output end of the mixing valve and an input end of the bucket to be controlled;
a temperature sensor serving as sensing a temperature of water flow which passes through the mixing valve, as the temperature is lower than a set value, the diverter communicates the output end of the mixing valve with the bucket, and a flowing pipe between the mixing valve and the at least one watering members is closed so that cold water stored in the pipe is recycled toward the bucket, as the temperature is higher than the set value, the diverter communicates the output end of the mixing valve with the at least one watering member, and the flowing pipe between the mixing valve and the bucket is closed so that cold water stored in the pipe is guided to the at least one watering member.

3. The water dispensing device capable of recycling cold water as claimed in claim 2, wherein the diverter further comprises:
a first solenoid valve fixed on a water pipe between the mixing valve and the bucket and is closed in a normal status, as the temperature sensed by the temperature sensor is lower than the set value, the first solenoid valve is opened so as to communicate the output end of the mixing valve with the bucket;
at least one second solenoid valve mounted on another water pipe between the mixing valve and the at least one watering members respectively and is closed in a normal status, as the temperature sensed by the temperature sensor is higher than the set value, the second solenoid valve is opened so as to communicate the output end of the mixing valve with the at least one watering member in response to the second solenoid valve.

4. The water dispensing device capable of recycling cold water as claimed in claim 2 further comprising a digital controller module connected with the diverter, the temperature sensor, and a motor; the digital controller module is used to control-the operation of the motor so as to turn on/off and control the mixing valve, and the digital controller module is used to receive and process detected signals from the temperature sensor so as to turn on/off and control the diverter.

5. The water dispensing device capable of recycling cold water as claimed in claim 4, wherein the digital controller module includes an internal controller with a central processor, a liquid crystal display, and an external controller to control the liquid crystal display.

6. The water dispensing device capable of recycling cold water as claimed in claim 2 further comprising
a controller connected with the diverter, the temperature sensor, and a motor; the controller is used to control the operation of the motor so as to turn on/off and control the mixing valve, and the controller is used to receive and process detected signals from the temperature sensor so as to turn on/off and control the diverter.

7. The water dispensing device capable of recycling cold water as claimed in claim 1, wherein the mixing valve is a mechanical control valve operated by manually.

8. The water dispensing device capable of recycling cold water as claimed in claim 1 further comprising a release valve to release the lower-pressure cold water in the bucket.

9. The water dispensing device capable of recycling cold water as claimed in claim 1, wherein a plurality of tubular containers are joined together by using their upper ends and lower ends to form the bucket, and the upper ends and lower ends of the tubular containers are in communication with each other by using at least one offset tube.

10. The water dispensing device capable of recycling cold water as claimed in claim 1, wherein the valve base includes a first valve member and a second valve member, both of which are screwed with each other, and a third valve member; the first valve member includes one part of the inlet, the outlet, and the inner chamber; the second valve member is formed a main part of the inner chamber; the third valve chamber is formed the low-pressure cold water intake.

11. The water dispensing device capable of recycling cold water as claimed in claim 1 further comprising
a water pump communicating with the first pipe and the output end of the bucket so that as the mixing valve is opened and the water in the bucket reaches a predetermined condition, the water pump is actuated to push the low-pressure cold water in the bucket toward the first pipe, thus replacing the supply of high-pressure cold water; as the water in the bucket does not satisfy the predetermined condition, the water pump is stopped to suspend the supply of low-pressure cold water and starts the supply of high-pressure cold water.

12. The water dispensing device capable of recycling cold water as claimed in claim 11, wherein the predetermined condition is a predetermined pressure of storing water.

13. The water dispensing device capable of recycling cold water as claimed in claim 11, wherein the predetermined condition is a predetermined level.

14. A water dispensing device capable of recycling cold water comprising:
a mixing valve connected with a first pipe for supplying cold water and a second pipe for supplying hot water and being turned on/off so that the cold water and the hot water mix at a proper proportion to be outputted;
at least one watering member connected with an output end of the mixing valve;
a bucket connected with the output end of the mixing valve and the first pipe to receive lower-pressure cold water when a diverter diverts flow to the bucket as a water temperature is too low, and as the mixing valve is opened and the lower-pressure cold water in the bucket reaches a predetermined condition, the lower-pressure cold water in the bucket is supplied to the first pipe so as to completely or partially replace high-pressure cold water; as the lower-pressure cold water in the bucket does not satisfy the predetermined condition, a supply of the low-pressure cold water is stopped, thereby restarting a supply of the high-pressure cold water;
a control unit to sense a temperature of the water flow which passes through the mixing valve, as a sensed temperature is less than a water flowing set value, cooled water stored in the second pipe is recycled toward the bucket and then is supplied to the first pipe, thereby obtaining recycling and reusing purpose, while the sensed temperature is more than the water flowing set value, the cold water stored in the first pipe flows toward the at least one watering member;
a pressure on-off valve connected with the first pipe and an output end of the bucket and allowing to be in an open state as the mixing valve is actuated, and as the water in the bucket is over a predetermined pressure, the output end of the bucket communicates with the first pipe, and the first pipe between the high-pressure cold water and the mixing valve is closed so that the low-pressure cold water from the bucket is guided to the first pipe; and as the pressure of the bucket is lower than the predetermined pressure, the output end of the bucket and the first pipe are closed, and the first pipe between the high-pressure cold water and the mixing valve is communicated to restart the supply of high-pressure cold water;

wherein the pressure on-off valve is assembled in a multi-valve manner and comprises:

a pressure valve having a valve base, a valve core, and a resilient element;

the valve base including a high-pressure cold water inlet for inputting the high-pressure cold water, a cold water outlet, a low-pressure cold water intake for inputting low-pressure cold water, and an inner chamber, all of which are in communication with each other;

the valve core defined in the inner chamber of the valve base and pushed by the resilient element to communicate with the high-pressure cold water passage between the high-pressure cold water inlet and the cold water outlet; as a pressure of the low-pressure cold water intake is over a predetermined pressure, the resilient element pushes the valve core rearward so that the high-pressure cold water passage is closed;

a first check valve including a low-pressure cold water port and a cold water opening; the low-pressure cold water port communicating with the low-pressure cold water passage between the output end of the bucket and the low-pressure cold water intake; the cold water opening being in communication with the first pipe between the cold water outlet of the pressure valve and an input end of the mixing valve;

a second check valve including a cold-water inflowing bore and a cold-water outflowing hole; the cold-water inflowing bore communicating with the cold water outlet of the pressure valve via the first pipe and the cold water opening of the first check valve.

15. The water dispensing device capable of recycling cold water as claimed in claim 14, wherein the valve base includes a first valve member and a second valve member, both of which are screwed with each other, and a third valve member; the first valve member includes one part of the inlet, the outlet, and the inner chamber; the second valve member is formed a main part of the inner chamber; the third valve chamber is formed the low-pressure cold water intake.

* * * * *